United States Patent Office 3,049,556
Patented Aug. 14, 1962

3,049,556
IMPROVED PROCESS FOR THE PRODUCTION OF FLUORO HYDROXY STEROIDS
Ralph F. Hirschmann, Scotch Plains, N.J., assignor to Merck & Co., Inc., Rahway, N.J., a corporation of New Jersey
No Drawing. Filed Nov. 12, 1958, Ser. No. 773,173
3 Claims. (Cl. 260—397.45)

This invention relates to an improved process for the conversion of oxido steroids to the corresponding fluorohydroxy steroids.

The fluoro steroids such as 9α-fluorohydrocortisone acetate and 9α-fluoro-16α-hydroxyprednisolone are valuable anti-inflammatory agents currently being used therapeutically. The introduction of the fluoro substituent in such compounds is usually accomplished by reacting the corresponding 9β,11β-oxido-21-acyloxy compound with aqueous or anhydrous hydrogen fluoride in the presence of a solvent for the resulting 9α-fluoro-11β-hydroxy compound. For example, solvents such as methylene chloride, chloroform, mixtures of chloroform and tetrahydrofuran and mixtures of acetic and propionic acids have been used for this purpose. Upon completion of the reaction, the desired product is recovered by washing the reaction mixture with aqueous alkali, separating the solvent solution, and finally evaporating the solvent.

The use of solvents for the recovery and separation of the fluoro steroids has a number of disadvantages. In the first place the recovery of the desired product is complicated by the steps of extracting the aqueous layer, washing and drying the solvent layer, and finally evaporating the solvent. Further, these procedures require large volumes of solvents since the fluoro steroids are not very soluble in the solvents. Also, the use of solvents requires additional equipment for carrying out the extraction and washing steps and for recovering such solvents. In addition, this method is not suitable for the fluorination of steroid alcohols such as 20-keto-21-hydroxy pregnanes and unsaturated pregnanes since these alcohols are even more insoluble than the corresponding esters and require large volumes of solvents. Accordingly, such alcohols are usually first converted to a suitable ester such as the 21-acetate, and this ester is then converted to the corresponding fluorohydroxy steroid. When the desired final product is the free alcohol, it is then necessary to hydrolyze the fluoro ester to produce the desired product. Further, the reaction of the steroid ester with hydrogen fluoride sometimes results in partial cleavage of the ester, and a mixture of the ester and the free alcohol is obtained which must be esterified or hydrolyzed depending upon the form of the product desired. The prior art methods for preparing the fluoro steroids are therefore unsatisfactory in several respects and improved methods for the preparation of these fluorinated steroids have been sought.

It is an object of this invention to provide an improved method for the conversion of oxido steroids to the corresponding fluoro-hydroxy steroids whereby the desired product can be readily recovered in high yields. Another object is to provide a method whereby the oxido steroid alcohols can be directly converted to the corresponding fluoro-hydroxy steroid alcohols. Still another object of my invention is to provide an improved process whereby the use of large amounts of solvents is avoided and the product can be recovered in crystalline form by filtration. Other objects will be apparent from the detailed description of my invention hereafter provided.

In accordance with this invention, these desiderata are achieved by adding the oxido steroid to a hydrogen fluoride-tetrahydrofuran mixture at low temperatures, quenching the resulting reaction mixture with aqueous alkali, and recovering the precipitated fluoro-hydroxy steroid by filtration.

It is indeed surprising and unexpected to find that this fluorination reaction can be carried out in the mixture of hydrogen fluoride and tetrahydrofuran without the addition of any other solvent. I have found that this mixture has the desirable property of being a suitable solvent for the oxido steroids and makes it unnecessary to utilize additional solvents. Further, the method of the present invention can be utilized to convert oxido steroid alcohols to the corresponding fluoro-hydroxy steroid alcohols, thus avoiding the necessity of first converting the alcohol to an ester and then subjecting this ester to fluorination. Accordingly, my process has the additional advantage of avoiding the esterification and hydrolysis steps usually required when other fluorination methods are employed in order to convert the oxido steroid alcohols to the corresponding fluoro-hydroxy steroid alcohols.

The improved procedure of the present invention is carried out by adding the oxido steroid, as a solid or in the form of a suspension in tetrahydrofuran, to a hydrogen fluoride-tetrahydrofuran mixture and allowing the reaction to continue at low temperature for sufficient time to complete the formation of the desired fluoro-hydroxy steroid. In carrying out this method of preparing the fluoro-hydroxy steroids, it is found that maximum yields of the desired product are obtained when the reaction is carried out at temperatures below about 10° C., although temperatures up to about 20° C. can also be employed. The process is conveniently effected by cooling the reaction solutions to a lower temperature of the order of about −50° to −60° C. and then allowing the reaction mixture to warm up to between about 0° and 10° C., and maintaining the reaction mixture at this temperature for sufficient time to complete the formation of the desired fluoro-hydroxy steroid.

The hydrogen fluoride-tetrahydrofuran reagent employed in the process of the present invention is prepared by mixing anhydrous hydrogen fluoride with tetrahydrofuran. The ratio of hydrogen fluoride to tetrahydrofuran should be in excess of about 1 mol of hydrogen fluoride per mol of tetrahydrofuran since at ratios below this the reaction is very slow and poor yields of the desired fluoro steroids are obtained. In general, I prefer to use a hydrogen fluoride-tetrahydrofuran reagent wherein the molar ratio of hydrogen fluoride to tetrahydrofuran is within the range of about 3 to 8. At such concentrations the reaction is rapid and maximum yields of the desired products are obtained under optimum conditions. I find the use of a reagent consisting of about 2 parts by weight of hydrogen fluoride and 1 part by weight of tetrahydrofuran (molar ratio about 7 to 7.5 to be especially useful in my process since this reagent permits the use of minimum amounts of the solvent.

After completion of the fluorination reaction, the mixture is quenched by the addition of aqueous alkali. In order to avoid the formation of undesirable by-products, it is preferred to carry out this quenching of the reaction at temperatures below about 10° C. Any alkali can be employed for this purpose, although I prefer to use an aqueous alkali such as an alkali metal carbonate, for example, sodium or potassium carbonate for this purpose. The amount of alkali used should be sufficient to neutralize the excess hydrogen fluoride and render the reaction mixture slightly alkaline. When an alkali metal carbonate is used, I prefer to use an amount equivalent to one mol for each mol of hydrogen fluoride to be neutralized.

The addition of the aqueous alkali to the fluorination reaction mixture results in the precipitation of the fluoro hydroxy steroid from the reaction mixture. Usually this occurs in the form of a gum or oil which contains tetrahydrofuran. This tetrahydrofuran is then removed by warming the reaction mixture under reduced pressure whereupon the solvent is quickly removed and the precipitate is changed to a crystalline solid which can be readily removed from the mixture by filtration.

My improved procedure for the preparation of fluorohydroxy steroids is useful in converting oxido steroids where the oxido group is attached to adjacent carbon atoms of the cyclopentanophenanthrene ring system. Thus, oxido steroids such as 5β,6β-oxido steroids, 9β,11β-oxido steroids, 11β,12β-oxido steroids and 16β,17β-oxido-steroids are converted to the corresponding 5β-hydroxy-6α-fluoro steroids, 9α-fluoro-11β-hydroxy steroids, 11β-hydroxy-12α-fluoro steroids, and 16α-fluoro-17β-hydroxy steroids respectively. In particular, this method is especially useful in converting oxido derivatives of 20-keto pregnanes and unsaturated pregnanes, including substituted pregnanes and substituted unsaturated pregnanes to the corresponding fluoro-hydroxy-20-keto pregnanes and unsaturated pregnanes.

Examples of suitable oxido steroids which can be converted to the corresponding fluoro-hydroxy steroids in accordance with the process of the present invention that might be mentioned are:

9β,11β-oxido-17-methyltestosterone,
9β,11β-oxido-17β-hydroxy-17α-methyl-androstane-3-one,
11β,12β-oxido-17α-ethyl-17β-hydroxy-4-androsten-3-one,
11β,12β-oxido-17α-ethynyl-17β-hydroxy-4-androsten-3-one,
9β,11β-oxido-17-ethinyl-17β-hydroxy-1,4,6-androstatriene-3-one,
11β,17α,21-trihydroxy-14α,15α-oxido-4,6-pregnadiene-3,20-dione,
6α,17α-dimethyl-9β,11β-oxido-17β-hydroxy-4-androsten-3-one,
9β,11β-oxido-17α,21-dihydroxy-4-pregnene-3,20-dione,
9β,11β-oxido-17α-hydroxy-pregnane-3,20-dione,
9β,11β-oxido-17α,21-dihydroxy-1,4-pregnadiene-3,20-dione,
9β,11β-oxido-16α-methyl-17α,21-dihydroxy-1,4-pregnadiene-3,20-dione,
9β,11β-oxido-16α,17α,21-trihydroxy-4-pregnene-3,20-dione,
6α-methyl-9β,11β-oxido-17α,21-dihydroxy-4-pregnene-3,20-dione,
6α-methyl-9β,11β-oxido-17α,21-dihydroxy-1,4-pregnadiene-3,20-dione,
11β,12β-oxido-21-hydroxy-4-pregnene-3,20-dione,
11β,12β-oxido-17α,21-dihydroxy-1,4-pregnadiene-3,20-dione,
6α,16α-dimethyl-9β,11β-oxido-17α,21-dihydroxy-1,4-pregnadiene-3,20-dione, and the like as well as the 21-acyloxy derivatives of the appropriate alcohols.

The method of my present invention is especially useful in converting oxido-20-keto-17,21-dihydroxy-pregnanes and unsaturated oxido-20-keto-17,21-dihydroxy pregnanes to the corresponding fluoro-hydroxy steroids. As discussed above, when the desired fluorinated steroid is the 21-alcohol, my new process can be used to convert the oxido-21-alcohol to the corresponding fluorinated steroid directly, thus avoiding the additional steps of preparing the 21-ester and then hydrolyzing the fluorinated 21-ester to obtain the desired fluorinated alcohol. For example, my new procedure makes it possible to convert 9β,11β-oxido-16α-methyl-17α,21-dihydroxy-1,4-pregnadiene-3,20-dione directly to 9α-fluoro-11β,17α,21-trihydroxy-16α-methyl-1,4-pregnadiene-3,20-dione, thereby avoiding the necessity of first converting the starting material to an ester, and then hydrolyzing the fluorinated ester. My method therefore makes it possible to produce the fluoro-21-alcohols much more economically than was heretofore possible. Not only is it possible to obtain enhanced yields of the desired alcohols, but my method also avoids the use of large volumes of solvents and the concomitant need for additional equipment for the handling and recovery of such large volumes of solvents.

The usefulness of my process to effect the conversion of oxido-20-keto-17α,21-dihydroxy pregnanes and unsaturated pregnanes to the corresponding fluoro-hydroxy compounds is indeed surprising. In the first place, the sensitivity of the 21-OH side chain to acid is well known. Hence, it might have been anticipated that the reaction of oxido-20-keto-17α,21-dihydroxy steroids with hydrogen fluoride would also give rise to the formation of appreciable amounts of such by-products. Secondly, in view of the limited solubility of 20-keto-17α,21-dihydroxy steroids in the usual solvents including tetrahydrofuran, it might have been expected that my new process would not be suitable for the preparation of fluorinated 20-keto-17α,21-dihydroxy steroids.

The following examples are presented to illustrate the improved method of carrying out the fluorination of oxido steroids.

EXAMPLE 1

*9α-Fluoro-11β,17α,21-Trihydroxy-16α-Methyl-1,4-Pregnadiene-3,20-Dione*

A suspension of 1.75 g. of 9β,11β-oxido-17α,21-dihydroxy-16α-methyl-1,4-pregnadiene-3,20-dione in 4.9 ml. of tetrahydrofuran was chilled to about −60° C. and mixed with 7.35 ml. of a hydrogen fluoride-tetrahydrofuran mixture (2:1 by weight) in a polyethylene bottle. The resulting reaction mixture was held at about 5° C. for two hours; the oxide dissolving at once at this temperature. The mixture was again cooled to −60° C. and added slowly to a well-stirred mixture of 26.4 g. of potassium carbonate, 26 ml. of water and ice. The resulting mixture was warmed to about 30° C. and the tetrahydrofuran removed under reduced pressure. This caused the gummy product which had separated after quenching the reaction mixture with the aqueous potassium carbonate to separate in the form of a filterable solid. The 9α-fluoro-11β,17α,21-trihydroxy-16α-methyl-1,4-pregnadiene-3,20-dione was recovered by filtration, washed thoroughly with water and dried to constant weight affording 1.73 g. The product so obtained was washed with four 5 ml. portions of chloroform and dried to constant weight to yield about 1.3 g. of product which was found to be about 94% pure by phase solubility.

The product so obtained can be further purified as follows: A 1.02 aliquot was dissolved in 2 ml. of dimethylformamide and filtered and the funnel washed twice with 0.5 ml. of the same solvent. The product was precipitated by the addition of 11.5 ml. of water to the filtrate. The 9α-fluoro-11β,17α,21 - trihydroxy - 16α - methyl - 1,4-pregnadiene-3,20-dione recovered by filtration and drying was found to be about 97% pure by phase solubility.

EXAMPLE 2

*9α-Fluoro-11β,17α-Dihydroxy-16α-Methyl-21-Acetoxy-1,4-Pregnadiene-3,20-Dione*

A suspension of 3.95 g. of 9β,11β-oxido-16α-methyl-17α-hydroxy-21-acetoxy-1,4-pregnadiene-3,20-dione in 5.6 ml. of tetrahydrofuran was mixed with 8.4 ml. of hydrogen fluoride-tetrahydrofuran (2:1 by weight) at −60° C. in a polyethylene bottle. The mixture was held at 0–5° C. for about two hours, cooled to about −60° F., and then poured slowly into a solution of 30 g. of potassium carbonate in 30 ml. of ice water. The resulting mixture was warmed to about 30° C. under reduced pressure to remove the tetrahydrofuran. The precipitated 9α-fluoro-11β-17α-dihydroxy-16α-methyl-21 - acetoxy - 1,4 - pregnadiene-3,20-dione was removed by filtration and dried affording 3.34 g. of product.

EXAMPLE 3

*6α,16α-Dimethyl-9α-Fluoro-11β,17α,21-Trihydroxy-1,4-Pregnadiene-3,20-Dione*

A slurry of 195 mgs. of 9β,11β-oxido-17α,21-dihydroxy-6α,16α-dimethyl-1,4-pregnadiene-3,20 dione in 0.6 ml. of tetrahydrofuran was cooled to −60° C. 0.82 ml. of a mixture of hydrogen fluoride and tetrahydrofuran 2:1 by weight was then added at −60° C. The solution was placed in an ice bath and allowed to remain at 0° C. for 2 hours. The solution was then cooled to −60° C. and added dropwise to a mixture consisting of 2.96 gms. of potassium carbonate, 3 ml. of water and 3–4 gms. of ice. The resulting slurry was concentrated in vacuo to essentially no tetrahydrofuran, cooled and filtered. The product was washed neutral with water and dried in vacuo to 200 mgs. The cooled product was chromatographed on Florisil. The 15% and 20% acetone in normal hexane fractions were combined and triturated with ethyl acetate to yield pure 6α,16α-dimethyl-9α-fluoro prednisolone, M.P. 229–231° C. U.V. max. 2390 EG=375.

EXAMPLE 4

11β,21-Dihydroxy-12α-Fluoro-4-Pregnene-3,20-Dione

When the procedure described in Example 1 is followed using 11β,12β-oxido-21-hydroxy-4-pregnene-3,20-dione as the starting material, 11β,21-dihydroxy-12α-fluoro-4-pregnene-3,20-dione is obtained.

The 11β,12β-oxido-21-hydroxy-4-pregnene - 3,20 - dione used as the starting material in this example can be prepared as follows:

Using the experimental conditions described in United States Patent 2,628,966, 12α-bromo-21-hydroxy-4-pregnene-3,11,20-trione is reacted with excess semi-carbazide to form the 3,20-bissemicarbazone; this compound is reacted with lithium boronhydride in tetrahydrofuran to form 11β-21-dihydroxy-12α-bromo-4-pregnene-3,20-dione-3,20-bissemicarbazone; reaction of this compound with a pyruvic acid affords 11β,21-dihydroxy-12α-bromo-4-pregnene-3,20-dione; and treatment of this compound with a base yields 11β,12β-oxido-21-hydroxy-4-pregnene-3,20-dione.

This latter compound can then be acetylated by reaction with acetic anhydride to form the 21-acetate derivative when this compound is treated with the hydrogen-fluoride-tetrahydrofuran reagent as described above, 11β,21-dihydroxy-12α-fluoro-4-pregnene-3,20-dione-21-acetate is obtained.

EXAMPLE 5

9α-Fluoro-11β,17α,21-Trihydroxy-16β-Methyl-1,4-Pregnadiene-3,20-Dione

When the procedure of Example 1 is repeated using 9β,11β-oxido-17α,21-dihydroxy-16β-methyl - 1,4 - pregnadiene-3,20-dione as the starting material, 9α-fluoro-11β,17α,21-trihydroxy-16β-methyl-1,4-pregnadiene - 3,20-dione is obtained.

EXAMPLE 6

9α-Fluoro-11β,17α,21-Trihydroxy-4-Pregnene-3,20-Dione

When the procedure of Example 1 is repeated using 9β,11β-oxido-17α,21-dihydroxy-4-pregnene-3,20 - dione as the starting material, 9α-fluoro-11β,17α,21-trihydroxy-4-pregnene-3,20-dione is obtained.

EXAMPLE 7

9α-Fluoro-11β,17α-Dihydroxy-21-Acetoxy-1,4-Pregnadiene-3,20-Dione

When the procedure of Example 1 is repeated using 9β,11β-oxido-17α-hydroxy-21-acetoxy - 1,4 - pregnadiene-3,20-dione as the starting material, 9α-fluoro-11β,17α-dihydroxy-21-acetoxy - 1,4 - pregnadiene - 3,20 - dione is obtained.

EXAMPLE 8

9α-Fluoro-11β,16,17α-Trihydroxy-21-Acetoxy-1,4-Pregnadiene-3,20-Dione

When the procedure of Example 1 is repeated using 9β,11β-oxido-16,17α-dihydroxy-21 - acetoxy - 1,4 - pregnadiene-3,20-dione as the starting material, 9α-fluoro-11β,16,17α-trihydroxy-21-acetoxy-1,4-pregnadiene-3,20 - dione is obtained.

EXAMPLE 9

9α-Fluoro-11β,16,17α,21-Tetrahydroxy-1,4-Pregnadiene-3,20-Dione

When the procedure is Example 1 is repeated using 9β,11β-oxido-16,17α,21-trihydroxy-1,4-pregnadiene - 3,20-dione as the starting material, 9α-fluoro-11β,16,17α,21-tetrahydroxy-1,4-pregnadiene-3,20-dione is obtained.

The 9β,11β-oxido-17α,21-dihydroxy - 16α - methyl - 1,4-pregnadiene and its acetate used as the starting materials in Examples 1 and 2 can be prepared in accordance with procedures described in the copending application of Arth, Johnston and Sarett, Serial No. 642,655, filed February 27, 1957, and in my copending application Serial No. 742,993, filed June 19, 1958. These processes are as follows:

3α-hydroxy-16-pregnene-11,20-dione-3-acetate is reacted with methyl magnesium iodide in the presence of cuprous chloride thereby forming 16α-methyl-3α-hydroxy-pregnane-11,20-dione 3-acetate, which is reacted with aqueous methanolic hydrochloric acid to form 16α-methyl-3α-hydroxy-pregnane-11,20-dione. The latter compound, which is a potent anesthetic, is reacted with acetic anhydride in the presence of p-toluene sulfonic acid catalyst to form a mixture of enol acetate containing 16α-methyl-3α,20-dihydroxy-17,20-pregnene-11-one 3,20 - diacetate; this mixture, after chromatographic purification over acid washed alumina to remove any unchanged starting material, is reacted with perbenzoic acid and the resulting 16α-methyl-17α,20-epoxy - 3α,20 - dihydroxy-pregnane-11-one 3,20-diacetate is hydrolyzed with methanolic potassium bicarbonate to produce 16α-methyl-3α,17α-dihydroxy-pregnane-11,20-dione. The latter compound is reacted with bromine in chloroform to form 21-bromo-16α-methyl-3α,17α-dihydroxy-pregnane-11,20-dione which is reacted with sodium iodide in acetone to produce 21-iodo-16α-methyl-3α,17α-dihydroxy-pregnane-11,20-dione which is converted without isolation to 16α-methyl-3α,17α,21-trihydroxy-pregnane-11,20-dione 21-acetate by reaction with anhydrous potassium acetate; this compound is reacted with chromium trioxide in pyridine to form 16α-methyl - 17α,21 - dihydroxy-pregnane-3,11,20-trione 21-acetate. The 16α - methyl - 16α,21 - dihydroxy - preg - nane - 3,11,20 - trione 21 - acetate is reacted with bromine in glacial acetic acid-chloroform to produce 4-bromo-16α - methyl - 17α,21 - dihydroxy - pregnane - 3,11,20 - trione, which is then reacted with semicarbazide to form 16α - methyl - 17α,21 - dihydroxy - 4 - pregnene - 3,11, 20 - trione 3,20 - bissemicarbazone 21 - acetate. This 3,20 - bissemicarbazone is reacted with sodium borohydride to form 16α-methyl-11β,17α,21-trihydroxy-4-pregnene-3,20-dione 3,20-bissemicarbazone which is hydrolyzed under acid conditions to form 16α-methyl-11β,17α, 21-trihydroxy-4-pregnene-3,20-dione. This latter compound is then converted to the corresponding 1,4-pregnadiene compound by contacting it with the dehydrogenating activity of microorganisms of the class Schizomycetes, for example, Bacillus sphaericus (ATCC 245) or Nocardia asteroides (ATCC 9970). The 16α-methyl-11β,17α,21-trihydroxy-1,4-pregnadiene-3,20-dione so obtained is then reacted with acetic anhydride in the presence of pyridine to produce the corresponding 16α-methyl-11β,17α,21-trihydroxy-1,4-pregnadiene-3,20-dione-21-acetate. These reactions are more fully described in Serial No. 642,655.

The 11β,17α,21-trihydroxy-16α-methyl-1,4-pregnadiene-3,20-dione-21-acetate is reacted with a dehydrating agent such as methane-sulfonyl chloride to produce 16α-methyl-17α,21-dihydroxy - 1,4,9(11) - pregnatriene-3,20-dione-21-acetate. Upon adding aqueous perchloric acid to a suspension of this compound and N-bromosuccinamide in acetone, the bromohydrin, 9α-bromo-11β,17α,21-trihydroxy-1,4-pregnadiene-3,20-dione-21-acetate, is obtained. Reaction of the latter compound with sodium methoxide in a mixture of tetrahydrofuran and methanol affords a mixture of 9β,11β-oxido-16α-methyl-17α,21-dihydroxy-1,4-pregnadiene-3,20-dione and the 21-acetate derivative which upon acetylation with acetic anhydride is converted to the 21-acetate derivative. Hydrolysis of the acetate with sodium methoxide in methanol affords the free alcohol 9β,11β-oxido-16α-methyl - 17α,21 - dihydroxy - 1,4 - pregnadiene-3,20-dione.

The 9β,11β-oxido 17α,21-dihydroxy-16β-methyl-1,4-pregnadiene-3,20-dione used as the starting material in Example 6 can be prepared as follows:

To a solution of 3α-acetoxy-16-pregnene-11,20-dione in a mixture of tetrahydrofuran and ethyl ether is added diazomethane to produce 3α-acetoxy-16α,17α-methyleneazopregnane-11,20-dione (M.P. 186–190° C.) which precipitated from solution. Heating this compound at about 180° C. in vacuo produces 3α-acetoxy-16-methyl-16-pregnene-11,20-dione (M.P. 165–167° C.) which upon reaction with hydrogen peroxide in the presence of sodium hydroxide in methanol solution for 18 hours at room temperature affords 16α,17α-epoxy-3α-hydroxy-16β-methyl-pregnane-11,20-dione (M.P. 178–180° C.). When this compound is treated with perchloric acid in aqueous dioxane at 25–30° C. for 65 hours and the resulting reaction mixture is diluted with water a mixture of 3α,17α-dihydroxy-16-methyl - 15 - pregnene - 11,20-dione and 3α,17α-dihydroxy-16-methylene-11,20-pregnane dione (M.P. 158–167° C.) is precipitated and recovered by filtration. Reduction of this mixture with hydrogen in methanol in the presence of palladium-calcium carbonate catalyst affords a mixture of 3α,17α - dihydroxy-16α-methyl-pregnane-11,20-dione and 3α,17α-dihydroxy-16β-methylpregnane-11,20-dione sintering at 150° C. Bromination of this mixture with bromine in chloroform at 40–45° C. affords a mixture of 21-bromo-3α,17α - dihydroxy-16α-methylpregnane-11,20-dione and 21-bromo-3α,17α-dihydroxy-16β - methylpregnane-11,20-dione which upon reaction with potassium acetate and potassium iodide in acetone produces a mixture of 3α,17α,21-trihydroxy-16β-methyl - pregnane - 11,20-dione-21-acetate and 3α,17α,21-trihydroxy - 16α - methylpregnane-11,20-dione-21-acetate. To a solution of this mixture is aqueous t-butanol at 10–15° C. is added N-bromosuccinimide to produce a mixture of 17α,21-dihydroxy-16α-methylpregnane-3,11,20-trione-21-acetate and 17α,21-dihydroxy-16β-methylpregnane-3,11,20-trione - 21 - acetate which on chromatography on neutral alumina elution with chloroform-benzene (1:1) and benzene yields 17α, 21 - dihydroxy-16β-methylpregnane-3,11,20-trione-21-acetate (M.P. 210–213° C.). Reaction of this compound with bromine in a mixture of acetic acid and chloroform affords the corresponding 4-bromo compound (M.P. 165–170° C. dec.) which is converted by reaction with semicarbazide to the 3-semicarbazone of 17α,21-dihydroxy-16β - methyl-4-pregnene-3,11,20-trione-21-acetate. Treatment of this compound with a mixture of acetic acid and pyruvic acid gives 17α,21-dihydroxy-16β-methyl-4-pregnene-3,11,20-trione-21-acetate (M.P. 226–232° C.). Conversion of this compound to the disemicarbazone, reduction of the disemicarbazone with sodium borohydride, and cleavage of the reduction product affords 11β,17α,21-trihydroxy-16β-methyl-4-pregnene-3,20-dione. Acetylation of this product with acetic anhydride in the presence of pyridine gives the 21-acetoxy compound which is converted to the corresponding 1,4-pregnadiene compound by reacting it with selenium dioxide in t-butyl alcohol under reflux for 48 hours. These reactions are described in detail in the pending application of David Taub, Norman L. Wendler and Harry L. Slates, Serial No. 722,390, filed March 19, 1958.

The 11β,17α,21-trihydroxy-16β-methyl-1,4-pregnadiene-3,20-dione-21-acetate is then converted to 9β,11β-oxido-17α,21 - dihydroxy-16β-methyl-1,4-pregnadiene-3,20-dione following the procedures described above for the corresponding 16α-methyl compound. These procedures are described in the copending application of Norman L. Wendler and David Taub, Serial No. 742,992, filed June 19, 1958.

The 9β,11β-oxido-17α,21-dihydroxy-6α,16α-dimethyl-1, 4-pregnadiene-3,20-dione employed as the starting material in Example 4 can be prepared as follows:

These 6,16 - dimethyl - 11-oxygenated-1,4-pregnadiene-17α,21-diol-3,20-dione compounds are prepared by reacting 16α - methyl-4-pregnene-17α,21-diol-3,11,20-trione with formaldehyde under acidic conditions to form 17α, 20,20,21 - bismethylenedioxy-16α-methyl-4-pregnene-3,11-dione which is reacted with ethylene glycol in the presence of an acidic catalyst to produce 3-ethylenedioxy-17α,20,20, 21 - bismethylenedioxy - 16α - methyl-5-pregnene-11-one. The latter compound is reacted with perbenzoic acid, perphthalic acid and the like, thereby forming 3-ethylenedioxy - 17α,20,20,21-bismethylenedioxy-5,6-epoxy-16α-methyl-pregnane-11-one which is then reacted with formic acid to produce a mixture of 17α,20,20,21-bismethylenedioxy - 16α-methyl-6-formyloxy-pregnane-5-ol-3,11-dione and 17α,20,20,21-bismethylenedioxy-16α-methyl-5-formyloxy-pregnane-6-ol-3,11-dione, which mixture, upon reaction with an aqueous alkali hydroxide solution, is converted to 17α,20,20,21-bismethylenedioxy-16α-methyl-allopregnane-3,6,11-trione. The last-named compound is reacted with butanone dioxolane to produce 3-ethylenedioxy - 17α,20,20,21 - bismethylenedioxy-16α-methyl-allopregnane-6,11-dione which is reacted with a methyl Grignard reagent to form 3-ethylenedioxy-17α,20,20,21-bismethylenediox - 6α,16α - dimethyl-allopregnane-6β-ol-11-one. This 3-ethylenedioxy-17α,20,20,21-bismethylenedioxy-6α,16α-dimethyl-allopregnane-6β-ol-11-one is reacted with a dehydrating agent such as thionyl chloride in pyridine to form the corresponding 3-ethylenedioxy-17α,20,20, 21 - bismethylenedioxy-6,16α-dimethyl-5-pregnene-11-one, which, upon reaction with p-toluene sulfonic acid monohydrate in acetone is converted to 17α,20,20,21-bismethylenedioxy-6α,16α-dimethyl-4-pregnene-3,11-dione; the latter compound is reacted with an aqueous organic acid hydrolyzing agent to form 6α,16α-dimethyl-4-pregnene-17α, 21-diol-3,11,20-trione which can be reacted with an acylating agent to form the corresponding 21-acylate. Alternatively, the 3 - ethylene-dioxy-17α,20,20,21-bismethylenedioxy-6,16α-dimethyl-5-pregnene-11-one, above-mentioned, can be reacted with lithium aluminum hydride thereby reducing the 11-keto substituent to an 11β-hydroxy radical to produce 3-ethylenedioxy-17α,20,20,21-bismethylenedioxy-6,16α-dimethyl-5-pregnene-11β-ol which is converted, by reaction with p-toluenesulfonic acid monohydrate in acetone, to 17α,20,20,21-bismethylenedioxy-6α,16α-dimethyl-4-pregnene-11β-ol-3-one; the latter compound is reacted with an aqueous organic acid hydrolyzing agent thereby forming 6α,16α-dimethyl-4-pregnene-11β,17α,21-triol-3,20-dione which can be reacted with an acylating agent thereby forming the corresponding 21-acylate derivative. The 6α,16α - dimethyl - 11β,17α,21-trihydroxy-4-pregnene-3,20-dione-21-acylate is then converted to the corresponding 1,4-pregnadiene compound by reaction with selenium dioxide. This process is fully described in the pending patent application of Glen E. Arth, Roger E. Beyler, and Lewis H. Sarett, Serial No. 683,923, now Patent No. 3,004,994, filed September 16, 1957.

The 6α,16α - dimethyl - 11β,17α,21-trihydroxy-4-pregnene-3,20-dione-21-acylate is then converted to 9β,11β-oxido-17α,21-dihydroxy-6α,16α-dimethyl-1,4-pregnadiene-3,20-dione following the procedures described above for the corresponding 16α-methyl compound.

Various changes and modifications may be made in carrying out the present invention without departing from the spirit and scope thereof. Insofar as these changes and modifications are within the purview of the annexed claims, they are to be considered as part of my invention.

What is claimed is:

1. In a process for preparing a compound selected from the group consisting of 9α-fluoro-11β,17α,21-trihydroxy-20-keto-pregnanes and 12α-fluoro-11β,17α,21-trihydroxy-20-keto-pregnanes by reacting the corresponding oxido steroid selected from the group consisting of 9β,11β-oxido and 11β,12β-oxido steroids with hydrogen fluoride, the improvement which comprises reacting said oxido steroid with a reagent consisting essentially of a mixture of hydrogen fluoride and tetrahydrofuran wherein the ratio of hydrogen fluoride to tetrahydrofuran is in excess of 1:1, maintaining said oxido steroid in contact with said mixture at a temperature of from about −60° C. to 20° C., quenching the resulting reaction mixture with aqueous alkali thereby precipitating the fluorohydroxy steroid, evaporating the tetrahydrofuran, and recovering the precipitated fluorohydroxy steroid.

2. The process of claim 1, wherein the steroid starting material is 9β,11β-oxido - 16α-methyl-17α,21-dihydroxy-1,4-pregnadiene-3,20-dione.

3. The process of claim 1 wherein the steroid starting material is 9β,11β-oxido-17α,21-dihydroxy-4-pregnene-3,20-dione.

References Cited in the file of this patent

UNITED STATES PATENTS

| | | |
|---|---|---|
| 2,813,109 | Colton et al. | Nov. 12, 1957 |
| 2,831,001 | Agnello et al. | Apr. 15, 1958 |
| 2,838,501 | Campbell et al. | June 10, 1958 |
| 2,876,219 | Cambell et al. | Mar. 3, 1959 |